United States Patent
Hua et al.

(10) Patent No.: US 6,667,746 B1
(45) Date of Patent: Dec. 23, 2003

(54) PRE-BLENDING TEXTURES

(75) Inventors: Hai Hua, Markham (CA); Indra Laksono, Richmond Hill (CA)

(73) Assignee: ATI International, SRL (KN)

(*) Notice: Subject to any disclaimer, the term of this patent is extended or adjusted under 35 U.S.C. 154(b) by 478 days.

(21) Appl. No.: 09/669,276

(22) Filed: Sep. 26, 2000

(51) Int. Cl.[7] .................................................. G09G 5/00
(52) U.S. Cl. ......................................... 345/582; 345/586
(58) Field of Search ................................. 345/582, 583, 345/584, 586

(56) References Cited

U.S. PATENT DOCUMENTS

| | | | | |
|---|---|---|---|---|
| 5,838,331 A | * | 11/1998 | DeBry | 345/582 |
| 5,870,102 A | * | 2/1999 | Tarolli et al. | 345/582 |
| 6,259,462 B1 | * | 7/2001 | Gruber et al. | 345/561 |
| 6,304,268 B1 | * | 10/2001 | Iourcha et al. | 345/582 |
| 6,483,505 B1 | * | 11/2002 | Morein et al. | 345/419 |

* cited by examiner

*Primary Examiner*—Matthew Luu
(74) *Attorney, Agent, or Firm*—Volpe & Koenig, P.C.

(57) ABSTRACT

An object to be displayed on a display screen is converted into at least one graphic primitive having associated texture data. The texture data is analyzed to determine whether operations associated with the texture data are commutative. A processor or a display engine is selected for performing the texture data operations based on in part the analysis.

16 Claims, 5 Drawing Sheets

PRE-BLENDING TEXTURES

BACKGROUND

The invention relates to graphics data processing for displayed video images. In particular, this invention relates to blending texture information for displayed video images.

A typical video display system 20 is shown in FIG. 1. The system 20 has a microprocessor 21 for processing data. Input devices 22, such as a keyboard and mouse, provide input data to the system 20. A system memory 23 stores data, such as the operating system and software applications. A display engine 28 processes image data and a frame buffer 29 stores image frames prior to display on the video monitor 30.

One approach is shown in FIG. 2 for displaying a three dimensional (3D) object on a display screen (step 40). The 3D object is converted into graphics primitives (step 41). A primitive is a geometric shape, such as a triangle, sphere, polygon, etc. For a typical object, most of the primitives are triangles. This image processing for the 3D object is performed by the microprocessor 21 using a 3D graphics application, typically using an adaptive port interface (API) and a standard 3D graphics library. The graphics application and library are stored in the system memory 23. After the 3D object is converted into primitives, the primitives are sent to the display engine 28 for further processing (step 42) prior to display on the display screen (step 43).

FIG. 3 illustrates how a pixel 60 at location (x,y) of a primitive is generated on a display screen 30. Surface direction coordinates (u,v) 62 associated with the vertices of the primitive which the pixel resides are used to add shape to the displayed primitive. Vertex texture coordinates, such as $(s_1,t_1)$ 66, $(s_2,t_2)$ 68 and $(s_3,t_3)$ 70, are used to add texture to the primitive. Each texture coordinate 66, 68, 70 is associated with a texture map 67, 69, 71. A bump map 73 indicates the unevenness of the primitive surface. To generate the pixel, the display engine 30 based on the surface direction coordinates 62, vertex texture coordinates 66, 68, 70 and bump map 73 (texture parameters) blends these texture parameters together to generate the pixel. To blend the texture parameters together, blending operations 65, such as multiplication, division, addition, subtraction, inverting and ORing are performed. Based on the blended texture parameters, the texture pattern and color associated with each displayed pixel is determined.

Since a similar procedure is performed on every pixel to be displayed on the display screen 30, the processing required by the display engine 28 is extensive. As a result of the heavy processing, display engines 28 performing these tasks must work at high speeds and with heavy workloads. Accordingly, it is desirable to have alternate approaches to displaying 3D objects.

SUMMARY

An object to be displayed on a display screen is converted into at least one graphic primitive having associated texture data. The texture data is analyzed to determine whether operations associated with the texture data are commutative. A processor or a display engine is selected for performing the texture data operations based on in part the analysis.

DESCRIPTION OF THE PREFERRED EMBODIMENTS

Figure 1:
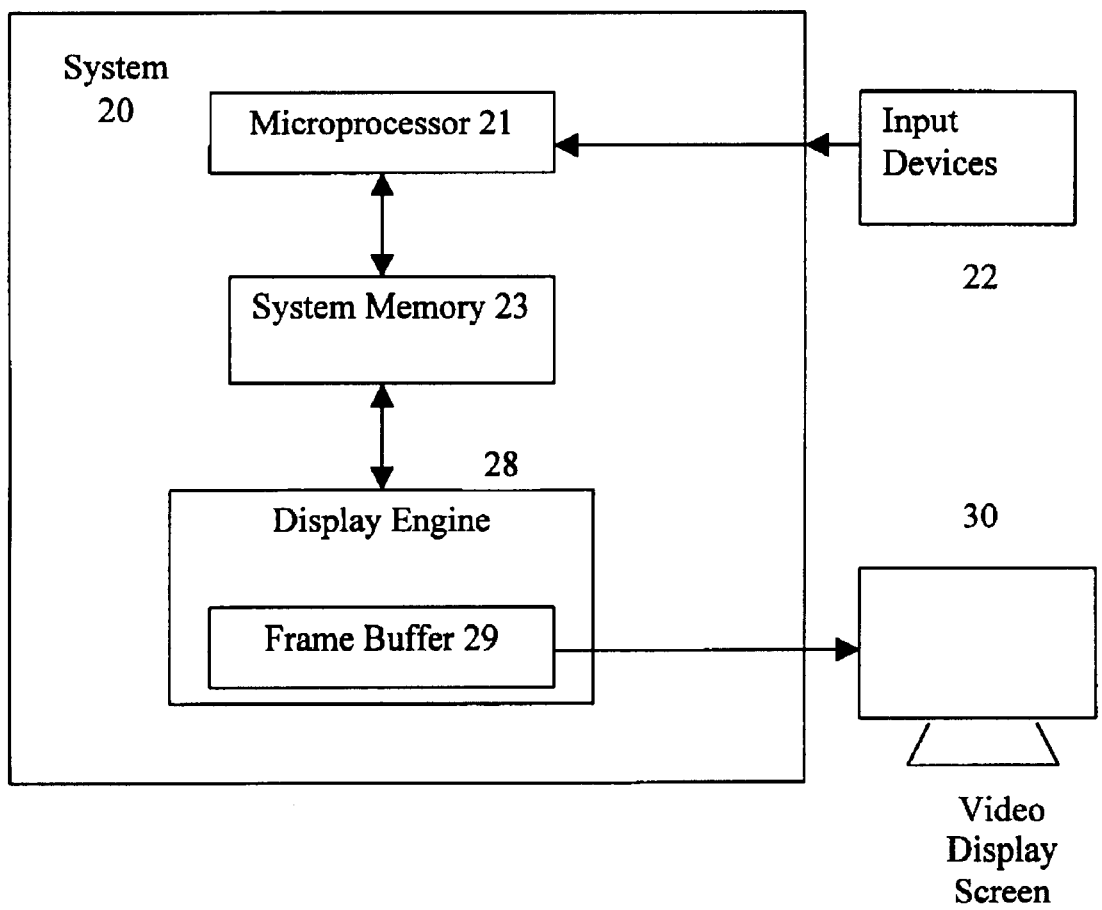
FIG. 1 is a video display system.
Figure 2:
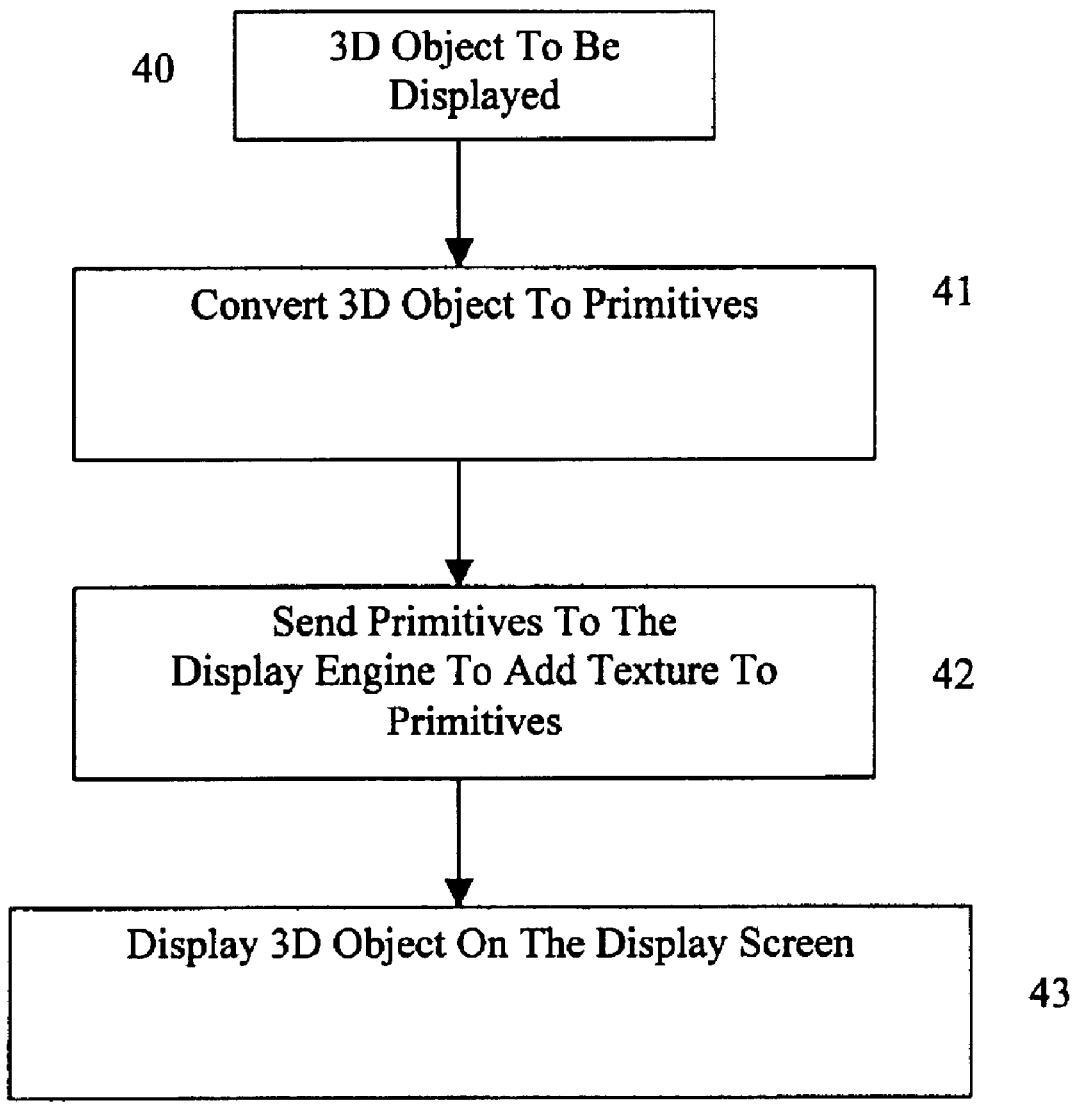
FIG. 2 is a flow chart for displaying a 3D object on a display screen.
Figure 3:
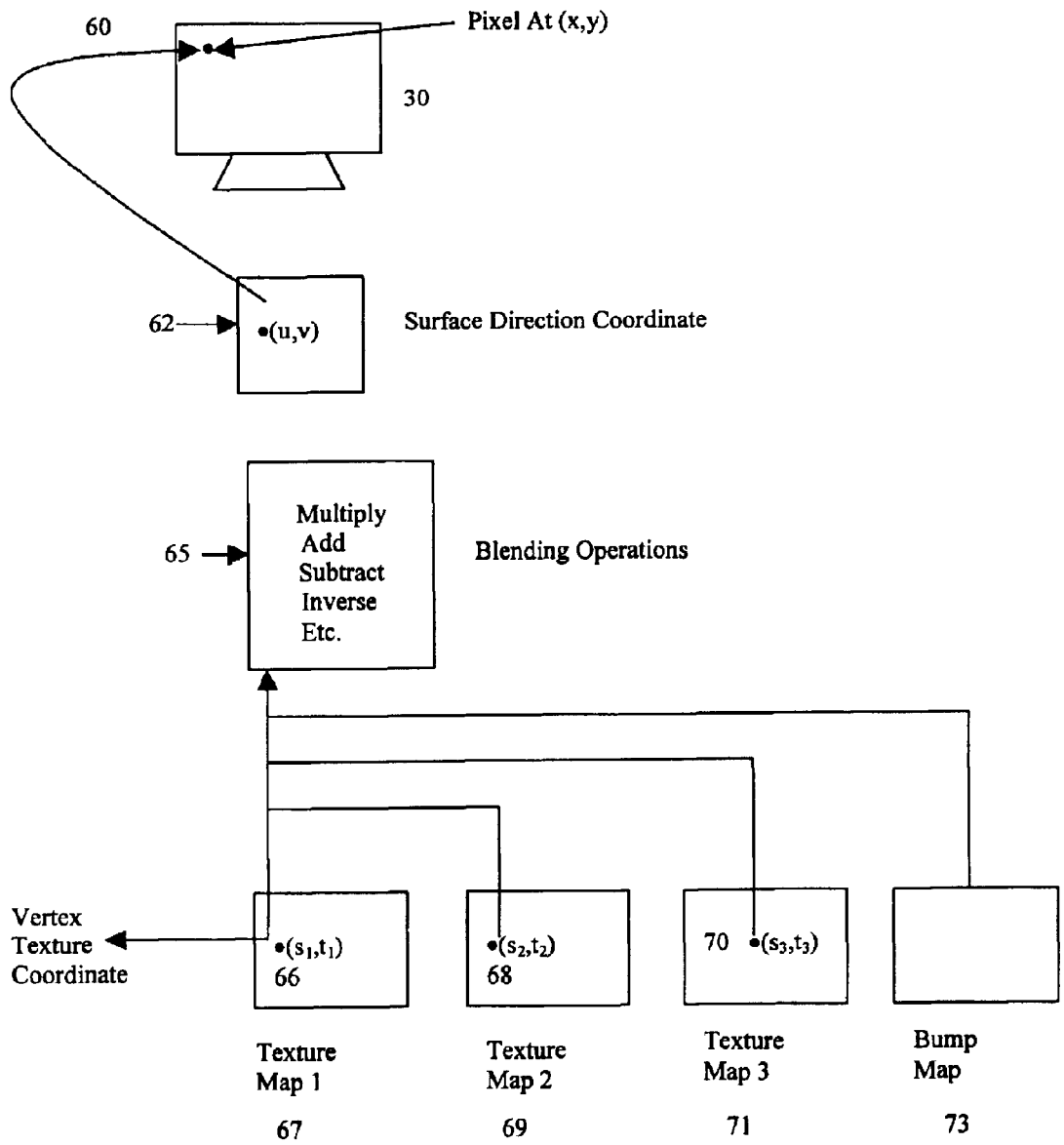
FIG. 3 illustrates the relationship among a pixel, surface direction coordinates and vertex texture coordinates.
Figure 4:
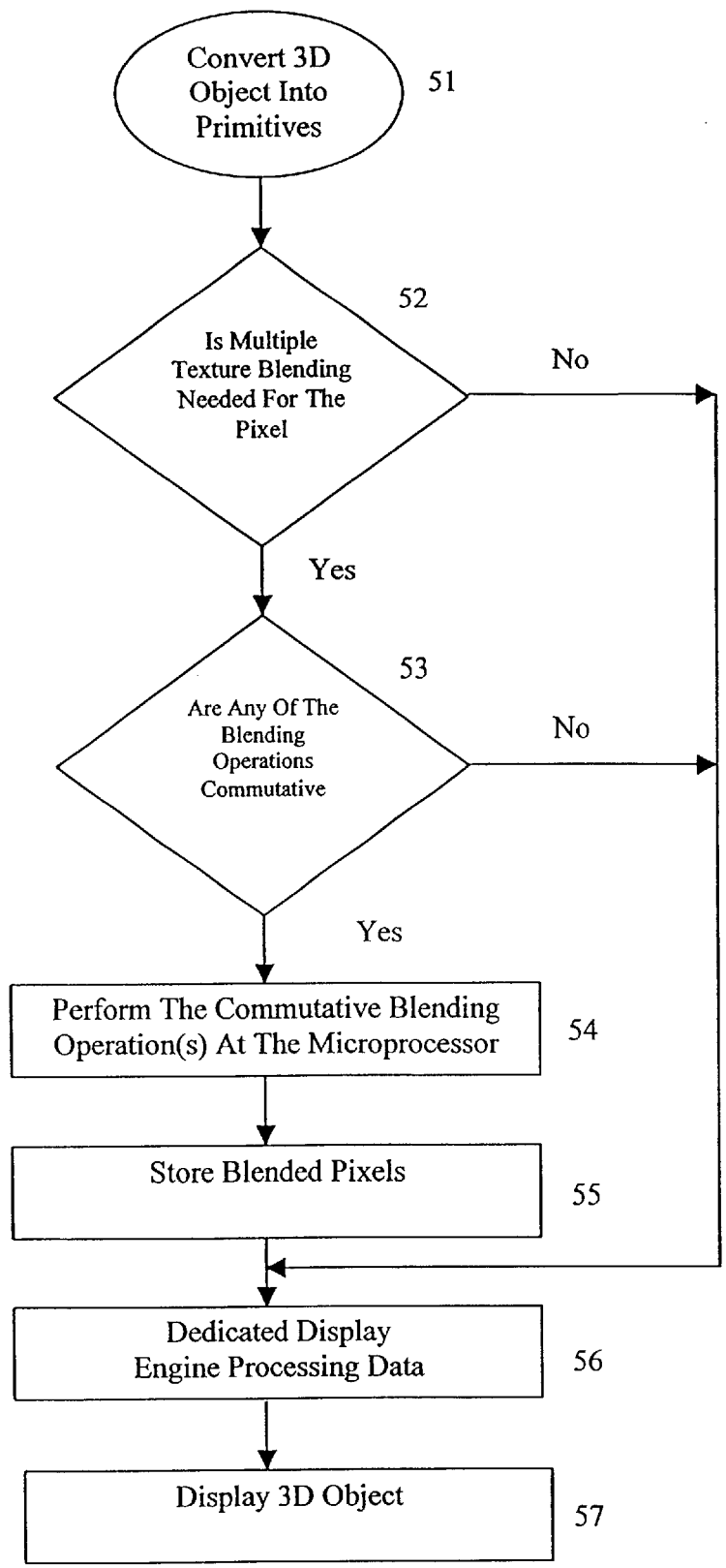
FIG. 4 is a flow chart for displaying a 3D object according to the present invention.
Figure 5:
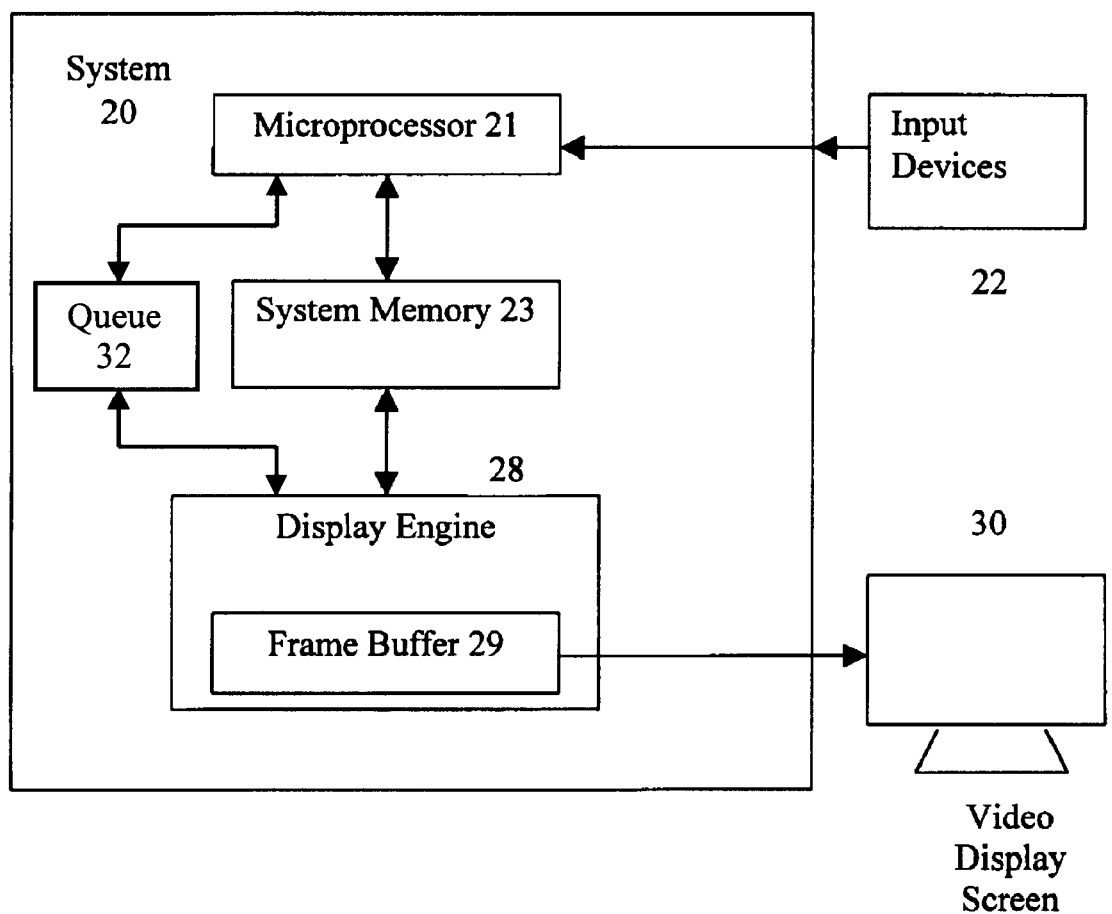
FIG. 5 is a block diagram of a video display system constructed in accordance with the present invention.

One approach to texture blending is illustrated in FIG. 4. A 3D object is converted into primitives (step 51). After analyzing each primitive and its associated vertex data, such as the surface direction coordinates 62, vertex data coordinates 66, 68, 70, and bump map 73, the microprocessor 21 determines whether multiple texture blending is required for the pixels of the primitive (step 52). Multiple texture blending is required when two or more textures need to be applied to the primitives such as texture coordinate $(s_1,t_1)$ and texture coordinate $(s_2,t_2)$. If multiple texture blending is not required, such as only one texture is applied, the primitive is sent to the display engine 28 for texture processing (step 56) If multiple texture blending. is required, the system analyzes the required blending operations (step 53). If any of the required operations are commutative, such as add, multiply, OR, etc., the microprocessor 21 performs the commutative blending operations (step 54). The microprocessor 21 applies and blends the textures requiring commutative blending to generate a single combined texture. The generated blended texture is stored (step 55) for use by the display engine 28 (step 56).

If textures are blended by the microprocessor 21, the microprocessor 21 sends the blended texture instead of the original vertex data to the display engine 28. The display engine 28 using the blended texture determines a value of each pixel of that primitive. If only one texture was applied or no commutative operations were required, the display engine 28 applies and/or blends the remaining textures to determine each pixel's value (step 56). After each pixel's value has been determined, the pixels are stored in an image frame in the image frame buffer 29 and subsequently displayed on a display screen 30 (step 57).

Since the order of which commutative operations are performed does not impact further operations, the blended texture can be passed from the microprocessor 21 for immediate use by the display engine 28. If the microprocessor 21 performed non-commutative operations, the microprocessor 21 would need to perform a blending for each potential order. To illustrate, if the microprocessor 21 was required to perform the division of A and B, both A divided by B and B divided by A would need to be performed by the microprocessor 21. The multiple non-commutative blending utilizes valuable microprocessor resources and complicates the software.

In a typical application, non-commutative operations are rare. As a result, the additional resources required by the display engine 28 to perform the non-commutative operations is small.

To further enhance the workload balance between the microprocessor 21 and the display engine 28, the use of the microprocessor 21 for blending may only be used during periods of heavy display engine loading. The display engine 28 performs the blending until its queue 32 is filled to a predetermined level. When the queue 32 reaches that level, the microprocessor 21 will then perform the blending for the commutative operations.

What is claimed is:

1. A method for displaying an object on a display screen, comprising the steps of:

provided a processor and a display engine;

converting the object into at least one graphic primitive having associated texture data;

analyzing the texture data to determine whether operations associated with the texture data are commutative;

selecting the processor or the display engine to perform the texture data operations, based on in part the analysis;

performing the texture data operations to produce pixels for display; and displaying the produced pixels on the display screen.

2. The method of claim 1 further comprising the step of blending surface direction coordinates with at least one of plural vertex data coordinates and a bump map in the display engine to create pixel values of the primitive.

3. The method of claim 2 further comprising the step of queuing data to be blended from the processor to the display engine.

4. The method of claim 3 wherein the blending step is performed by the display engine when data for a number of primitives queued for the display engine is below a given level.

5. The method of claim 1 further comprising the step of performing commutative operations in the processor.

6. The method of claim 5 wherein the processor transfers data for a primitive to the display engine for blending when the processor has completed the commutative operations on the primitive data.

7. The method of claim 1 wherein the produced pixels of the primitive have a geometric shape.

8. The method of claim 1 further comprising the steps of:

determining, in the processor, if multiple texture blending is required for a given primitive; and transferring data for a primitive which does not require multiple texture blending from the processor to the display engine.

9. The method of claim 1 further comprising the steps of:

determining, in the processor, if multiple texture blending is required for a given primitive; and performing multiple blending in the processor of data for a primitive requiring multiple blending.

10. An apparatus for displaying an object on a display screen, comprising:

a processor for converting said object into at least one primitive;

a display engine operatively coupled to said processor and said display screen;

said processor analyzing texture data of said primitive to determine whether said processor or said display engine should process data for said primitive, said processor being responsive to whether texture data associated with said primitive requires a commutative operation; and said display engine controlling the operation of the display.

11. The apparatus of claim 10 where said processor includes means for transferring data of a primitive to said display engine for processing when multiple texture blending is not required.

12. The apparatus of claim 11 wherein said processor further includes means for processing data of a primitive requiring multiple texture blending.

13. The apparatus of claim 12 wherein said processor transfers data of the primitive processed by said processor to said display engine.

14. The apparatus of claim 13 wherein said display screen displays primitives requiring commutative processing and non-commutative processing under control of said display engine.

15. The apparatus of claim 11 further comprising means for queuing the data received by said display engine for processing, said queuing means causing said processor to blend data of primitives otherwise intended for processing by said display engine when data for a number of primitives awaiting processing in said queue reaches a given level.

16. The method of claim 3 wherein the blending step is performed by the processor when data for a number of primitives queued for the display engine reaches a certain level.

* * * * *